(12) United States Patent
Beldock et al.

(10) Patent No.: US 8,723,055 B2
(45) Date of Patent: May 13, 2014

(54) ELECTRIC PLUG SYSTEM

(76) Inventors: Gwen Beldock, Pacific Palisades, CA (US); Donald T. Beldock, New York, NY (US)

(*) Notice: Subject to any disclaimer, the term of this patent is extended or adjusted under 35 U.S.C. 154(b) by 206 days.

(21) Appl. No.: 13/429,989

(22) Filed: Mar. 26, 2012

(65) Prior Publication Data

US 2013/0248242 A1  Sep. 26, 2013

(51) Int. Cl.
*H02B 1/50* (2006.01)
*H01R 25/00* (2006.01)
*H01R 13/514* (2006.01)
*A47B 21/06* (2006.01)

(52) U.S. Cl.
CPC .............. *H02B 1/50* (2013.01); *H01R 25/006* (2013.01); *H01R 13/514* (2013.01); *A47B 21/06* (2013.01)
USPC ............. 174/494; 174/480; 174/482; 174/53; 220/3.2; 220/3.3; 439/650; 439/652

(58) Field of Classification Search
CPC .............. H02B 1/50; H02B 1/00; H02B 1/04; H02G 3/0493; H02G 3/28; H02G 3/185; H02G 3/18; H01R 25/003; H01R 25/00; H01R 25/006; H01R 13/514; A47B 9/14; A47B 21/06
USPC ......... 174/50, 53, 57, 58, 480, 481, 493, 494, 174/484, 482, 487, 496; 220/3.2, 3.3, 3.7, 220/4.02; 439/535, 654, 650, 638, 652, 439/655, 954; 52/220.1, 220.3, 220.7; 361/600, 601, 823
See application file for complete search history.

(56) References Cited

U.S. PATENT DOCUMENTS

| | | | | |
|---|---|---|---|---|
| 4,373,111 A * | 2/1983 | Myers et al. | | 174/493 |
| 4,780,571 A * | 10/1988 | Huang | | 174/484 |
| 5,230,552 A | 7/1993 | Schipper et al. | | |
| 5,284,255 A * | 2/1994 | Foster et al. | | 174/493 |
| 5,393,226 A | 2/1995 | Groom | | |
| 5,495,811 A | 3/1996 | Carson et al. | | |
| 5,595,494 A * | 1/1997 | Wiebe | | 174/494 |
| 5,776,559 A | 7/1998 | Woolford | | |
| 5,899,761 A * | 5/1999 | Crane et al. | | 439/654 |
| 6,017,228 A * | 1/2000 | Verbeek et al. | | 174/493 |
| 6,430,882 B1 * | 8/2002 | Feldpausch et al. | | 52/220.1 |
| 6,593,528 B2 * | 7/2003 | Franklin-Lees et al. | | 174/58 |
| 6,805,581 B2 * | 10/2004 | Love | | 439/652 |
| 6,897,379 B1 * | 5/2005 | Hsiao | | 174/53 |
| 7,004,786 B1 * | 2/2006 | Bloom et al. | | 439/535 |
| 7,341,463 B2 * | 3/2008 | Lai | | 174/484 |
| 7,442,090 B2 * | 10/2008 | Mori et al. | | 174/53 |

(Continued)

OTHER PUBLICATIONS

Vertical Stand Universal 3×4 Power Sockets (AC 250V), Product Description, DealExtreme, available at http://www.dealextreme.com/p/vertical-stand-universal-3x4-power-sockets-ac-250v-72958, downloaded Sep. 13, 2011.

*Primary Examiner* — Angel R Estrada
(74) *Attorney, Agent, or Firm* — Gordon & Jacobson, PC

(57) ABSTRACT

An electric plug system includes a stabilizing base, a vertical support element extending from the base, a horizontal electrical socket block having a plurality of female electrical sockets that is coupled to the top of the vertical support element, and an electrical wire extending from the horizontal electrical socket block, down the vertical element, and along or through the base and there-beyond and terminating in a male electrical plug adapted to plug into a standard wall or floor electrical outlet. The vertical support element can be a telescoping tube with a height control knob.

14 Claims, 4 Drawing Sheets

(56) References Cited

U.S. PATENT DOCUMENTS

| | | | |
|---|---|---|---|
| 7,626,119 B2 * | 12/2009 | Axland et al. | 174/53 |
| 7,905,749 B2 * | 3/2011 | Cleveland | 439/535 |
| 2003/0007360 A1 | 1/2003 | Hsieh | |
| 2011/0154975 A1 | 6/2011 | Belitz et al. | |
| 2011/0197466 A1 | 8/2011 | Shami et al. | |
| 2011/0197794 A1 | 8/2011 | Nunes | |

* cited by examiner

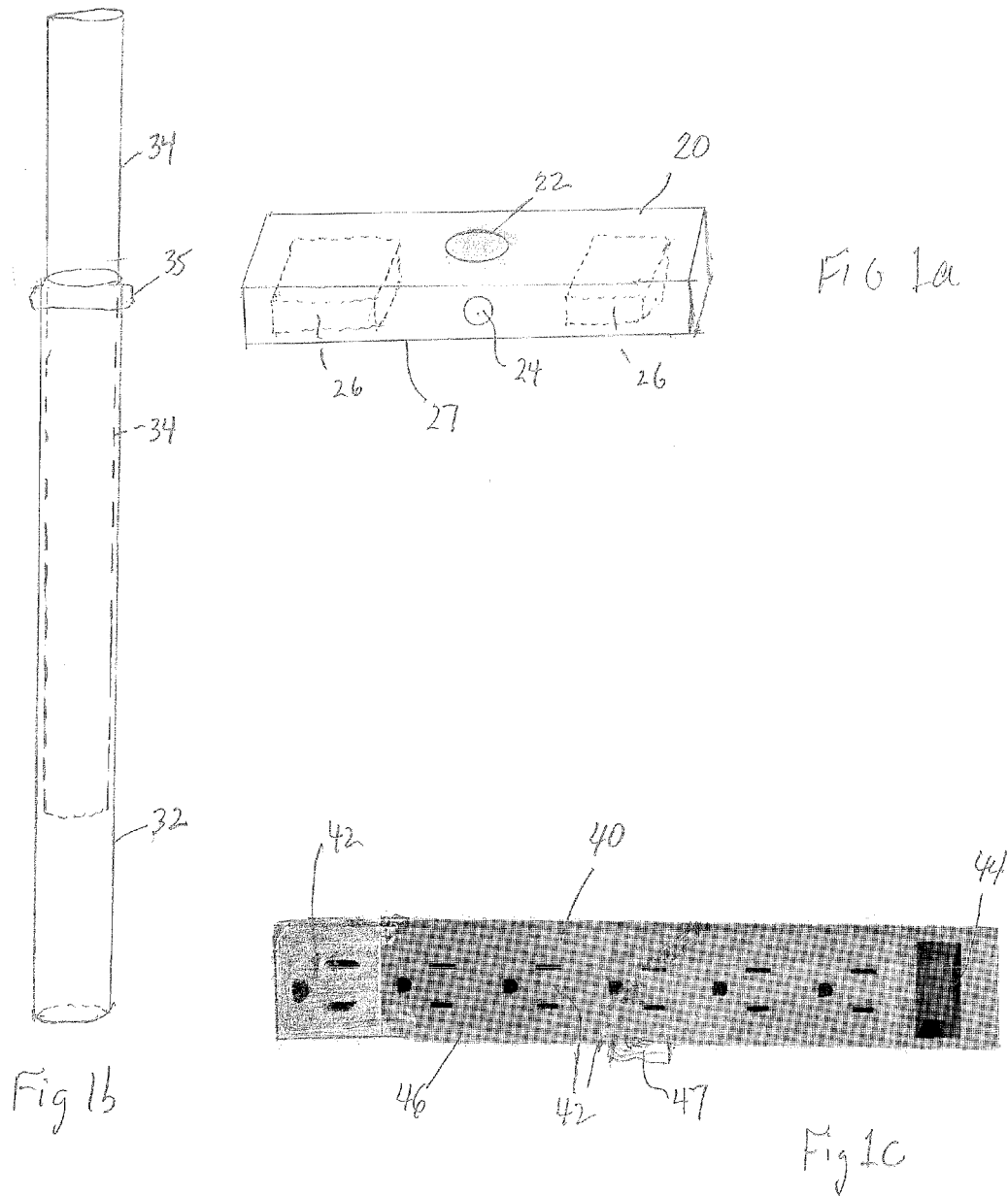

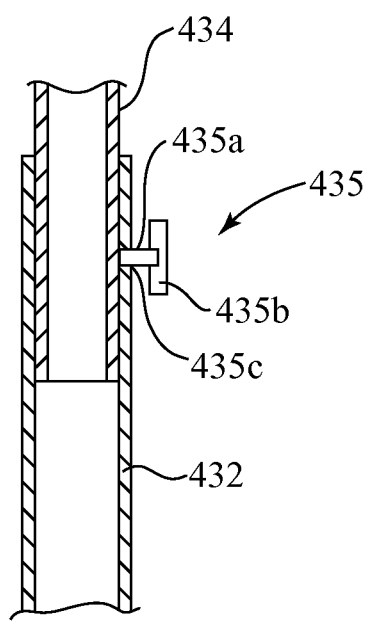
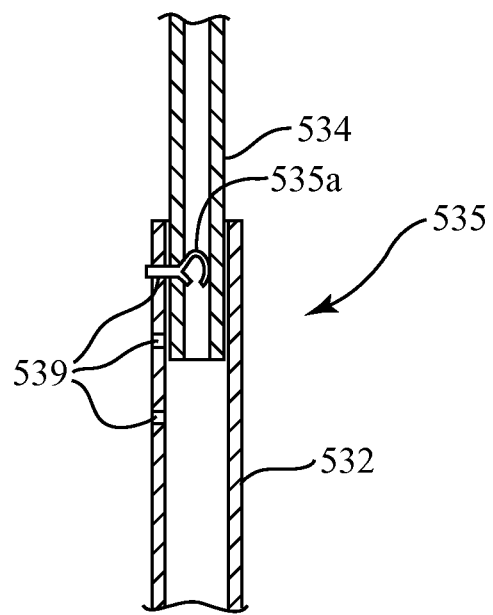
Fig. 4
Fig. 5

ELECTRIC PLUG SYSTEM

BACKGROUND

1. Field

This relates to multi-outlet electrical power source connections. More particularly, this relates to electrical plug systems that are easily usable by users whose flexibility and/or strength has been impaired by handicap, age, illness, or injury.

2. State of the Art

Power strips having a plug, a power cord, and block of electrical sockets (outlets) are ubiquitous in the modern home, office, and other facilities where multiple plug-in electrically powered devices, machines or equipment are utilized. The electrical sockets of the power strip are typically arranged in one or two rows. A power strip generally includes a circuit breaker or surge (overload) protector that safely limits the electric current flowing through the strip and prevents surges of current that can damage the equipment which receives power through a power strip outlet. The power strip also generally includes an on-off switch that turns the power strip on and off, thereby preventing current from reaching the outlets. If desired, each outlet may have its own switch. The switch is often illuminated. Many power strips also include sensor circuits that can detect the level of current flowing through a socket, and if the socket is not "active", will place the socket in standby mode in order to reduce current consumption.

Power strips are used by plugging the plug into a convenient wall or floor outlet, and by plugging the plugs of multiple devices into the electrical sockets of the power strip. In order to make the connection between the devices and the power strip outlets, the user often must crawl under a desk, table, or other furniture.

SUMMARY

An electric plug system is provided and includes a stabilizing base, a vertical support element extending from the base, a horizontal electrical socket block having a plurality of female electrical sockets that is coupled to the top of the vertical support element, and an electrical wire extending from the horizontal electrical socket block, down the vertical element, and along or through the base and there-beyond and terminating in a male electrical plug adapted to plug into a standard wall or floor electrical outlet.

According to one aspect, the vertical support element is a telescoping tube with a height control knob. According to another aspect, the vertical element is adjustable to cause the horizontal electrical socket block to be located between 24 and 42 inches off of the ground.

According to one embodiment, the stabilizing base is a weighted rectangular block. According to another embodiment, the stabilizing base is a weighted t-shaped block. According to another embodiment, the stabilizing base defines a triangular footprint.

BRIEF DESCRIPTION OF THE DRAWINGS

FIG. 1a is a perspective view of the stabilizing base of FIG. 1.
FIG. 1b is a perspective view of the vertical tube of FIG. 1.
FIG. 1c is a perspective view of the horizontal electrical socket block of FIG. 1.

FIG. 4 is a schematic diagram of a first alternate control element for controlling height of the vertical tube.
FIG. 5 is a schematic diagram of a second alternate control element for controlling height of the vertical tube.

DETAILED DESCRIPTION OF THE PREFERRED EMBODIMENTS

Figure 1:
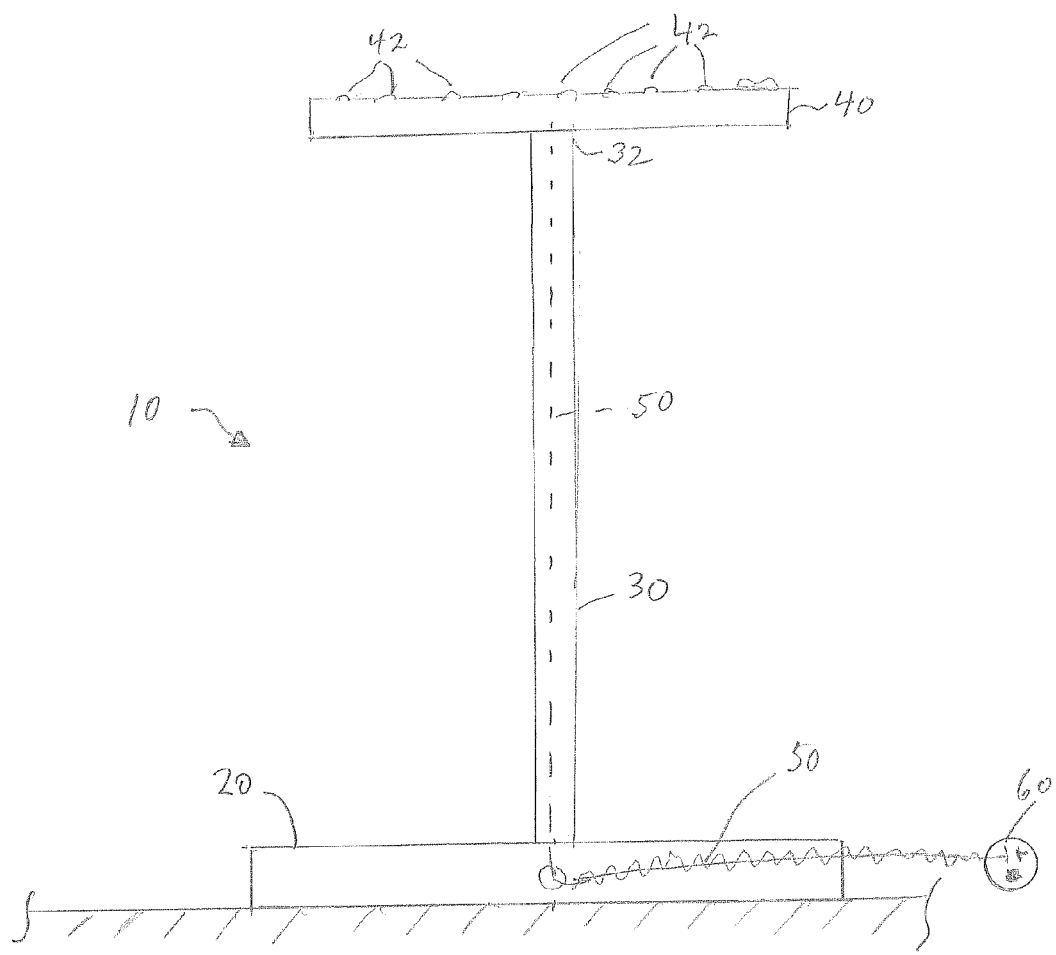
FIG. 1 is a schematic diagram of an electrical plug system.

FIG. 1 is a schematic perspective view of an electric plug system 10. System 10 includes a stabilizing base 20, a vertical tube or other support element 30 extending from the base 20, a horizontal electrical socket block 40 coupled to the top 32 of the vertical element and having a plurality of female electrical sockets 42, an electrical wire 50 extending from the horizontal electrical socket block 40, down the vertical element 30, and along or through the base 20 and there-beyond, and male electrical plug 60 that terminates the electrical wire 50. Electrical plug 60 adapted to plug into a standard wall or floor electric outlet (not shown). The entire system is adapted to rest stably on the floor in close proximity to a wall (e.g., baseboard) or floor mounted power outlet, and to receive male plugs of electrically powered devices and the force associated with the mating of the plugs into the electrical socket block (i.e., "plugging in") without tipping over. For purposes of the specification and claims, the term "electrically powered devices" is to be broadly understood to include any devices, machines or equipment that requires electrical power and receives that power through an electrical plug, even if only to recharge a battery in the device. By way of example only, such devices include but are not limited to computers, monitors, printers, televisions, telephones, and vacuum cleaners.

The stabilizing base 20 of system 10 is seen in more detail in FIG. 1a. Stabilizing base 20 is shown as a rectangular block with exemplary dimensions of 18 inches long by 9 inches wide, by 4 inches high. Other dimensions by way of example only include a base of between 8 and 36 inches long, between 3 and 18 inches wide, and between 1 and 10 inches high. Base 20 defines a top hole 22 for receiving the vertical tube 30 and the electrical wire 50, one or more of a front, back, or side hole 24 that is connected to top hole 22 and through which the electrical wire 50 exits. Base 20 is weighted with one or more weights 26 in such a manner and to such a degree as to ensure its ability to stand upright without significant susceptibility to tipping over unless subjected to inordinate unbalancing force. The total weight of base 20 by way of example only may be between five and fifty pounds. The bottom of base 20 preferably provides a rough (i.e., non-smooth) friction surface 27.

The vertical element 30 of the system 10 may constitute a single rod or tube. The primary function of vertical support element 30 is to support the socket block 40. An optional secondary function of vertical element 30 is to guide the electrical wire 50 from the socket block 40 to the base 20. To provide the optional secondary function, vertical element 30 may be hollow (as a tube), or may have an indentation into which the wire 50 may be placed. In one embodiment, as shown in FIG. 1b, vertical element 30 may including telescoping members 32 and 34 and a control element 35 for setting the relative position between telescoping members 32 and 34. Telescoping member 32 is used to extend into hole 22 defined in base 20 and telescoping member 34 slides inside of telescoping member 32 and is used to couple to vertical element 30 to the socket block 40 as described hereinafter. In one embodiment, each of telescoping member 32 and 34 is approximately two feet long, thereby permitting the socket block 40 to be adjustably located between approximately twenty-four and forty-two inches off of the ground. Other lengths of telescoping members may be utilized. Typically, to accommodate users whose flexibility and/or strength has been impaired by handicap, age, illness, or injury, it will be desirable to locate the socket block between thirty inches and thirty-six inches off of the ground. If telescoping members are utilized, they may be sized accordingly.

Telescoping members 32 and 34 are typically formed of metal tubes such as aluminum, steel, brass, or other suitable metals, or of plastic tubes such as PVC, acrylic, polycarbonate or other suitable plastics. They may be round or square in cross section or any other desired shape. The tubes are, by way of example only, between one-half inch and four inches in diameter, typically depending upon material utilized.

The control element 35 shown in FIG. 1b is a threaded knob which surrounds telescoping members 32 and 34 and when turned in one direction applies pressure on the members 32 and 34 to force them into frictional engagement, and when turned in the other direction releases the pressure to permit the members 32 and 34 to easily slide past each other.

Turning now to FIG. 1c, electrical socket block 40 is seen in more detail. Electrical socket block 40 includes six female sockets (plug plus ground) 42 in a single row, and an optionally illuminated rocker on-off switch 44 that can turn the power on and off; i.e., prevent current from reaching the outlet. The block 40 generally includes a circuit breaker or surge (overload) protector (not shown) that safely limits the electric current flowing through the strip and prevents surges of current that can damage the equipment which receives power through a power strip outlet and sensor circuits (not shown) that can detect the level of current flowing through a socket all located in the housing 46 which also houses the sockets 42 and switch 44. If a socket is not "active", the sensor circuit will place the socket in standby mode in order to reduce current consumption. The electrical socket block 40 is coupled to the vertical element 30 by one or more flanges 47 and preferably arranged such that the vertical element is centered relative to the electrical socket block. The sockets as shown in FIG. 1c are arranged facing upward (like a floor socket) such that plugs of electrically powered devices are plugged in by pushing vertically downward. However, if desired, the sockets could face forward (like a wall socket) such that plugs of electrically powered devices are plugged in by pushing horizontally (forward). The one or more flanges 47 may extend from the bottom of the socket block 40 and may be circular or arcuate so that the vertical element 30 fits therein, or may extend around the sides of the socket block and may be L-shaped. The one or more flanges may be formed as part of housing 46 of the socket block 40, or as part of the vertical element 30, or as separate pieces. Where separate pieces are utilized, fastening means may be used to fasten the pieces to the vertical element and/or the socket block 40.

It will be appreciated that electrical socket block 40 may take other forms. The sockets 42 may be arranged in multiple rows, and different numbers of sockets may be provided.

Figure 2:
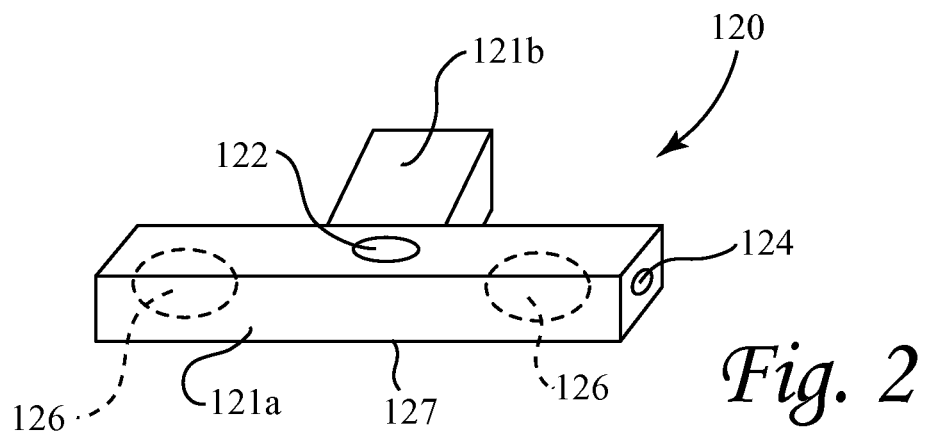
FIG. 2 is a perspective view of a first alternate stabilizing base.

A first alternate stabilizing base 120 is seen in FIG. 2. Stabilizing base 120 is t-shaped in cross-section with as a first rectangular portion 121a and a leg portion 121b which extends perpendicularly from the middle of the rectangular portion 121a. The rectangular portion 121a is by way of example between 8 and 36 inches long, and the leg portion 121b is by way of example between 2 and 8 inches long. Base 120 defines a top hole 122 for receiving the vertical tube 30 and the electrical wire 50, one or more of a front, back, or side hole 124 that is connected to top hole 122 and through which the electrical wire 50 exits. Base 120 is weighted with one or more weights 126 in such a manner and to such a degree as to ensure its ability to stand upright without significant susceptibility to tipping over unless subjected to inordinate unbalancing force. The total weight of base 120 by way of example only may be between five and fifty pounds. The bottom of base 120 preferably provides a rough (i.e., non-smooth) friction surface 127.

Figure 3:
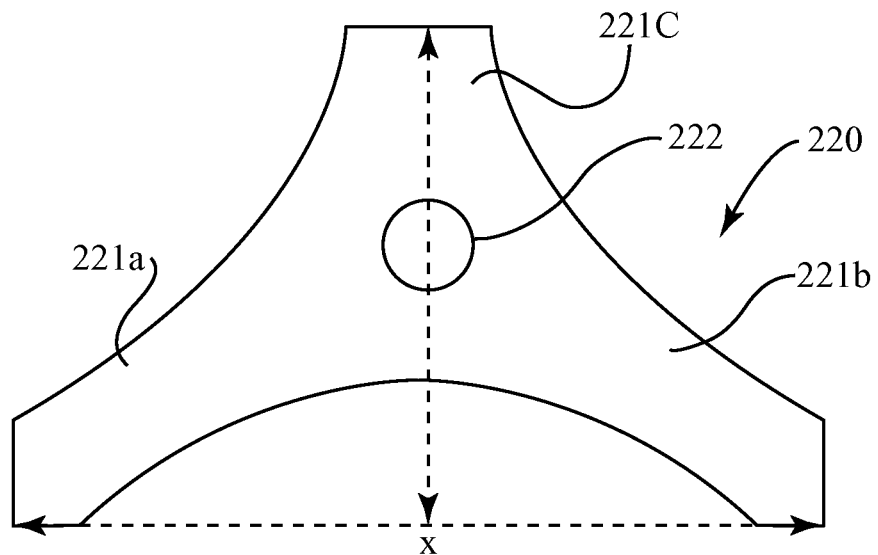
FIG. 3 is a top view of a second alternate stabilizing base.

A second alternate stabilizing base 220 is seen in FIG. 3. Stabilizing base 220 defines a substantially triangular footprint with leg portions 221a, 222b, 222c. The distance x from the end of leg portion 221a to the end of leg portion 221b, by way of example is between 8 and 36 inches and distance y from the front of the footprint to the end of leg portion 221c is by way of example between 3 and 8 inches. The base 220 may be generally flat or pyramidal. Base 220 defines a top hole 222 for receiving the vertical tube 230 and the electrical wire 50, and one or more side holes (not shown) that is/are connected to top hole 222 and through which the electrical wire 50 exits. Base 220 is weighted with one or more weights (not shown) in such a manner and to such a degree as to ensure its ability to stand upright without significant susceptibility to tipping over unless subjected to inordinate unbalancing force. The total weight of base 220 by way of example only may be between five and fifty pounds. The bottom of base 220 preferably provides a rough (i.e., non-smooth) friction surface (not shown).

According to one aspect, the vertical element is adjustable to cause the horizontal electrical socket block to be located between 24 and 42 inches off of the ground. As previously described, the adjustable height may be accomplished by providing a telescoping vertical member with a height control element. FIG. 4 shows a height control element 435 which includes a screw 435a coupled to a knob 435b, with the screw extending through a threaded hole 435c near the top of telescoping tube 432. By rotating the knob 435b in one direction, screw 435a extends further radially into the tube 432 and engages the inner tube 434 to prevent it from moving relative to the outer tube.

A second alternative height control element 535 is seen in FIG. 5 where telescoping tube 532 is provided with multiple side holes 539 and a spring button locking pin 535a is provided near the bottom of telescoping tube 534. The spring button locking pin 535a is adapted such that the pin will ride along the inside surface of the telescoping tube 532 and pop into one of the side holes 539 when so aligned at the desired height.

According to one aspect, the base 20, 120, 220 may be provided with an on-off switch that can be activated by a user's foot.

According to one aspect, the electrical wire 50 extending from the base can be provided at a desired length so that enough cord is available to place the system 10 at a desired location while still being able to connect to a floor or wall outlet.

According to one aspect, the electrical socket block may be provided with label holders adapted to receive labels that can identify the devices that are connected to the electrical socket block.

According to one aspect, one or more of the base, the vertical element and the socket block can be adapted decoratively to conform to a desired decorative setting. The system may be designed in various materials and colors to suit the taste of the individual user.

According to one aspect, the socket block may be round, oval, semi-circular, square, rectangular, or any shape which is convenient for ease of insertion of multiple male connector plugs emanating from various devices within the vicinity of the system.

According to one aspect, the female plug receptacles may be designed to incorporate simple pressure sensitive mechanical features to achieve easing and tightening of the coupling between the plug(s) and the receptacles without requiring the user to exert such force to achieve insertion or removal of plugs as to destabilize the system or exceed the capacity of the user.

According to one aspect, a night light (not shown) my be provided on one or more of the base, the vertical support element, or the horizontal electrical socket block. The night light may include a light sensor to automatically turn on when the light level in the ambient drops below a threshold. The night light may also include a switch to turn it on or off.

According to one aspect, an electric plug system for electrically powering electrical devices having male plugs and for use in conjunction with a wall or floor electrical outlet consists of (a) a stabilizing base adapted to stand on a horizontal floor surface, (b) a vertical support element supported by and extending from the base, (c) a horizontal electrical socket block coupled to a top portion of the vertical support element and supported thereby, the horizontal electrical socket block having a plurality of female electrical sockets adapted to receive the male plugs of the electrical devices, wherein the vertical support element is adapted to locate the horizontal electrical socket block at between twenty-four and forty-two inches above the horizontal floor surface, and (d) an electrical wire extending from the horizontal electrical socket block, down the vertical support element, and along or through the base and there-beyond, the electrical wire terminating in (e) a male electrical plug adapted to plug into the wall or floor electrical outlet. By providing these limited elements, the electric plug system is inexpensive to manufacture and simple to use.

By locating providing an electric plug system that is standalone, stable, and at a desirable height, the life of the elderly, and handicapped and impaired individuals will be enhanced.

There have been described and illustrated herein several embodiments of an electric plug system. While particular embodiments and aspects have been described, it is not intended that the claims be limited thereto, as it is intended that the claims be as broad in scope as the art will allow and that the specification be read likewise. Thus, while particular sizes (lengths, widths, heights) and weights have been disclosed, it will be appreciated that other sizes and weights could be used as well. In addition, while particular types of materials have been disclosed, it will be understood that other materials can be used. Also, while particular height control elements were described, it will be appreciated that other height control elements can be used. It will therefore be appreciated by those skilled in the art that yet other modifications could be made without deviating from the spirit and scope of the claims.

What is claimed is:

1. An electric plug system for use in conjunction with a wall or floor electrical outlet, said electric plug system for powering electrically powered devices having male plugs, comprising:
   a stabilizing base adapted to stand on a horizontal floor surface;
   a vertical support element supported by and extending from said base;
   a horizontal electrical socket block coupled to a top portion of said vertical support element and supported thereby, said horizontal electrical socket block having a plurality of female electrical sockets adapted to receive the male plugs of the devices, wherein said vertical support element is adapted to locate said horizontal electrical socket block at between twenty-four and forty-two inches above the horizontal floor surface; and
   an electrical wire extending from said horizontal electrical socket block, down said vertical support element, and along or through said base and there-beyond, said electrical wire terminating in a male electrical plug adapted to plug into the wall or floor electrical outlet, wherein
   said vertical support element comprises telescoping members with a height control element adjustable by the user.

2. An electrical plug system according to claim 1, wherein:
   said telescoping members comprise telescoping tubes with a first tube coupled to said stabilizing base and a second tube coupled to said horizontal electrical socket block.

3. An electrical plug system according to claim 2, wherein:
   at least one of said first tube and said second tube defines a threaded hole, and said vertical support element further comprises a screw coupled to a knob, said screw radially extending through said threaded hole.

4. An electrical plug system according to claim 2, wherein:
   at least one of said first tube and said second tube defines a plurality of longitudinally spaced side holes, and said vertical support element further comprises a spring button locking pin adapted to engage each said spaced side hole when properly aligned therewith.

5. An electrical plug system according to claim 2, wherein:
   said electrical wire running down said vertical support element runs through said vertical support element.

6. An electric plug system for use in conjunction with a wall or floor electrical outlet, said electric plug system for powering electrically powered devices having male plugs, comprising:
   a stabilizing base adapted to stand on a horizontal floor surface;
   a vertical support supported by and extending from said base;
   a horizontal electrical socket block coupled to a top portion of said vertical support and supported thereby, said horizontal electrical socket block having a plurality of female electrical sockets adapted to receive the male plugs of the devices, wherein said vertical support is adapted to locate said horizontal electrical socket block at between twenty-four and forty-two inches above the horizontal floor surface; and
   an electrical wire extending from said horizontal electrical socket block, down said vertical support, and along or through said base and there-beyond, said electrical wire terminating in a male electrical plug adapted to plug into the wall or floor electrical outlet, wherein
   said stabilizing base defines a first hole that receives said electrical wire extending down said vertical support and a second hole coupled to said first hole through which said electrical wire runs.

7. An electrical plug system according to claim 6, wherein:
   said stabilizing base includes at least one weight element causing said stabilizing base to weigh at least five pounds.

8. An electrical plug system according to claim 6, wherein:
   said stabilizing base is a rectangular block.

9. An electrical plug system according to claim 6, wherein:
   said stabilizing base is a t-shaped block.

10. An electrical plug system according to claim 6, wherein:
    said stabilizing base defines a substantially triangular footprint.

11. An electrical plug system according to claim 6, wherein:

said plurality of female electrical sockets are arranged in at least one row, and said electrical socket block includes at least one switch for controlling power to said plurality of female electrical sockets.

12. An electrical plug system according to claim 6, wherein:

said plurality of female electrical sockets are arranged facing upwards such that the electrical devices having male plugs are connected to said plurality of female electrical sockets by movement of said male plugs vertically downward.

13. An electrical plug system according to claim 6, wherein:

said plurality of female electrical sockets are arranged facing forwards such that the electrical devices having male plugs are connected to said plurality of female electrical sockets by movement of said male plugs horizontally.

14. An electrical plug system according to claim 6, wherein:

said vertical support comprises telescoping members with a height control element adjustable by the user, said stabilizing base comprises at least one weight element causing said stabilizing base to weigh at least five pounds, and said plurality of female electrical sockets are arranged in at least one row, and said electrical socket block includes at least one switch for controlling power to said plurality of female electrical sockets.

\* \* \* \* \*